US006843655B1

(12) United States Patent
Duprey

(10) Patent No.: US 6,843,655 B1
(45) Date of Patent: Jan. 18, 2005

(54) EDUCATIONAL TOY

(76) Inventor: John F. Duprey, 807 Sixth St., Watervliet, NY (US) 12189

( * ) Notice: Subject to any disclaimer, the term of this patent is extended or adjusted under 35 U.S.C. 154(b) by 0 days.

(21) Appl. No.: 10/873,137

(22) Filed: Jun. 23, 2004

(51) Int. Cl.[7] .............................................. G09B 27/08
(52) U.S. Cl. ........................ 434/133; 446/268; D19/61
(58) Field of Search ................................ 434/130, 133, 434/134, 136, 148; 446/268, 369, 370, 373, 71, 72, 76, 77; D10/10; D11/152, 157; D19/61

(56) References Cited

U.S. PATENT DOCUMENTS

| D67,422 S | | 5/1925 | Thompson | |
|---|---|---|---|---|
| 2,434,250 A | * | 1/1948 | Rebus | 40/411 |
| 2,643,598 A | * | 6/1953 | Carroll | 355/92 |
| 3,895,457 A | | 7/1975 | Koskiewicz | |
| 4,141,156 A | * | 2/1979 | Holtvoigt | 434/139 |
| 4,620,842 A | * | 11/1986 | Wang | 434/135 |
| D309,718 S | * | 8/1990 | Fotovat | D10/10 |
| 5,090,935 A | | 2/1992 | Monson | |
| 5,090,938 A | | 2/1992 | Reynolds | |
| D367,686 S | | 3/1996 | Decanay | |
| 5,888,117 A | * | 3/1999 | Sutton | 446/267 |
| D409,662 S | * | 5/1999 | Ho | D19/61 |
| D421,915 S | * | 3/2000 | Alexander, II | D10/8 |
| 6,422,974 B1 | * | 7/2002 | Schimmel | 482/44 |
| 6,500,005 B2 | * | 12/2002 | Akkashian | 434/131 |
| 6,659,840 B2 | | 12/2003 | Chastain et al. | |
| 2002/0045400 A1 | | 4/2002 | Chastain et al. | |
| 2002/0102909 A1 | | 8/2002 | Derraugh et al. | |

FOREIGN PATENT DOCUMENTS

| GB | 2 235 805 | 3/1991 |
|---|---|---|
| JP | 7000631 | 1/1995 |

OTHER PUBLICATIONS

"Santa on Globe TrueReplica Box", Feb. 2004 [retrieved online Oct. 8, 2004].*

* cited by examiner

Primary Examiner—Kurt Fernstrom
(74) Attorney, Agent, or Firm—Richard C. Litman

(57) ABSTRACT

The educational toy includes a toy figure having a body, a frame affixed within a portion of the body, and an earth globe disposed within the frame. The globe is configured to rotate within the frame. The toy figure may be a doll, a figurine, a teddy bear or other stuffed animal, an inflatable water toy, a hand or string puppet, or any other toy figure depicting a human, animal, alien, fantasy, or other character having a body capable of mounting a revolving globe therein. The globe is configured to represent the earth, and has outlines representing the continents and at least larger countries or geographical regions, and may have contours representing mountains or other features. Optionally, the educational toy may be illuminated, play back an educational audio message, or include a motor for rotating the globe.

14 Claims, 3 Drawing Sheets

EDUCATIONAL TOY

BACKGROUND OF THE INVENTION

1. Field of the Invention

The present invention relates to an educational toy and, more particularly, to a toy figurine which has a revolving globe disposed therein.

2. Description of the Related Art

Knowledge of geography is essential for appreciating the physical and social aspects of the complex global world in which we live. Traditional teaching devices for facilitating comprehension of world geography are rarely useful for most children. A conventional world globe, for example, is a teaching device which is frequently used to educate children on world geography. In the classroom, however, few children feel comfortable familiarizing themselves with a heavy globe which may rest on a teacher's desk or bookshelf. Outside of the classroom, most children would prefer to amuse themselves with toys rather than a traditional learning device, such as a globe of the earth. Thus, an educational toy incorporating a globe to teach world geography and the earth's rotation about an axis is desirable.

Educational toys associated with geographical or multicultural concepts are described or disclosed in U.S. Design Pat. No. 67,422, issued May 26, 1925 to V. C. Thompson (a doll); U.S. Design Pat. No. 367,686, issued Mar. 5, 1996 to Lolita B. Decanay (a doll); U.S. Patent Publication No. 2002/0045400, published Apr. 18, 2002 (set of dolls for simulating a universal beauty pageant); U.S. Patent Publication No. 2002/0102909, published Aug. 1, 2002 to Derraugh et al. (cloth shape with pockets for objects; U.S. Pat. No. 3,895,457, issued Jul. 22, 1975 to E. Koskiewicz (global sphere yo-yo device); U.S. Pat. No. 5,090,935, issued Feb. 25, 1992 to C. S. Monson (composite toy having interconnectable toy components); U.S. Pat. No. 5,090,938, issued Feb. 25, 1992 to C. Reynolds (toy or other object alterable between two different shapes); U.S. Pat. No. 6,659,840, issued Dec. 9, 2003 to Chastain et al. (set of dolls for simulating a universal beauty pageant); U.K. Patent No. 2,235,805, published Mar. 13, 1991 (educational globe toy); and Japanese Patent No. 7-631, published Jan. 6, 1995 (toy for intellectual training).

None of the above inventions and patents, taken either singly or in combination, is seen to describe the instant invention as claimed. Thus, an educational toy solving the aforementioned problems is desired.

SUMMARY OF THE INVENTION

The educational toy includes a toy figure having a body, a frame affixed within a portion of the body, and an earth globe disposed within the frame. The globe is configured to rotate within the frame. The toy figure may be a doll, a figurine, a teddy bear or other stuffed animal, an inflatable water toy, a hand or string puppet, or any other toy figure depicting a human, animal, alien, fantasy, or other character having a body capable of mounting a revolving globe therein. The globe is configured to represent the earth, and has outlines representing the continents and at least larger countries or geographical regions, and may have contours representing mountains or other features.

The educational toy may optionally include electronic features for lighting all or part of the globe; and/or for playing an audio message containing educational information regarding a geographical region displayed on the globe, or relating to the rotation of the earth, or other educational information.

Since most children generally engage in play with a doll, figurine, or other toy of some kind, children will feel comfortable handling the educational toy of the present invention frequently. The educational toy also helps children understand world geography, how the earth revolves on its axis, and day/night cycles.

These and other features of the present invention will become readily apparent upon consideration of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
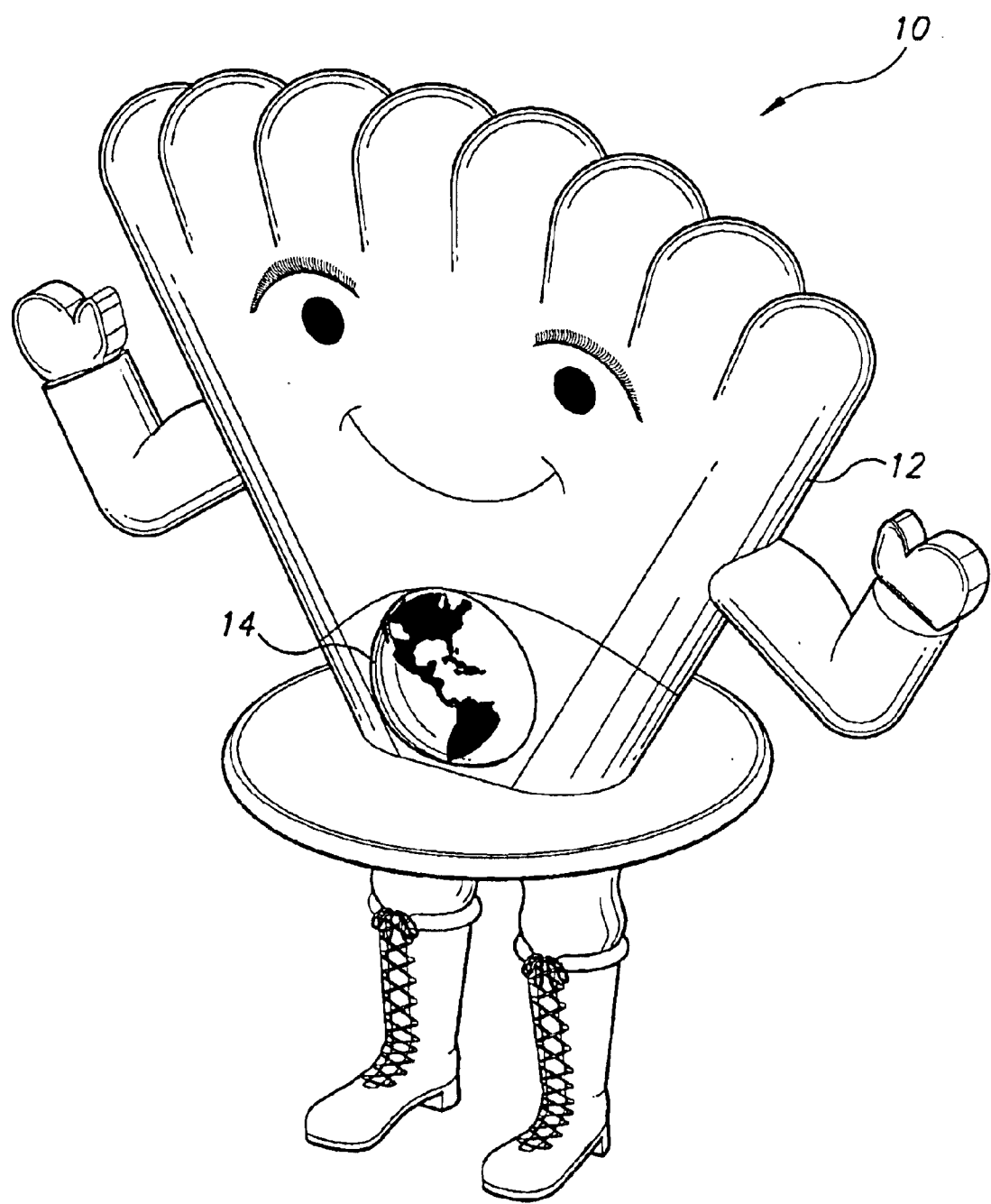
FIG. 1 is a perspective view of an educational toy according to the present invention.

The present invention relates to an educational toy, generally designated as 10 in the drawings. The educational toy includes a toy figure 12 and a globe 14 which is rotatable within the toy figure 12. Although a hemispheric portion of the globe 14 is viewable from a front side of the toy figure 12 in the drawings, the toy figure 12 may be configured to display a hemispheric portion of the globe 14 from both sides of the body of the toy figure 12. It will also be understood that the toy figure 12 is not limited to the scallop-shaped toy figure 12 depicted in the drawings and that the toy figure 12 can be of any suitable form or shape. As used in the present application, the term "toy figure" means a doll, figurine, stuffed animal, inflatable water toy, string or hand puppet, or any other toy having a body depicting a human, animal, alien, fantasy, or other character in which the body is capable of supporting a rotating globe. Thus, the toy figure 12 can include, for example, dolls, Santa Clause dolls, teddy bears, hand puppets, string puppets, inflatable rubber ducks typically used in the bathtub, figurines of real, cartoon, or fairy tale characters, etc. The toy figure 12 can be made from plastic, fabric, or other suitable material.

The globe 14 includes a map or image of the earth on its exterior surface, including any or all of the indicia of a standard reproduction of the earth's surface. Thus, the map may include raised portions or contours to represent mountain ranges, as well as other topography. The globe 14 can be made from plastic, fabric, foam, or any other suitable material.

Figure 2A:
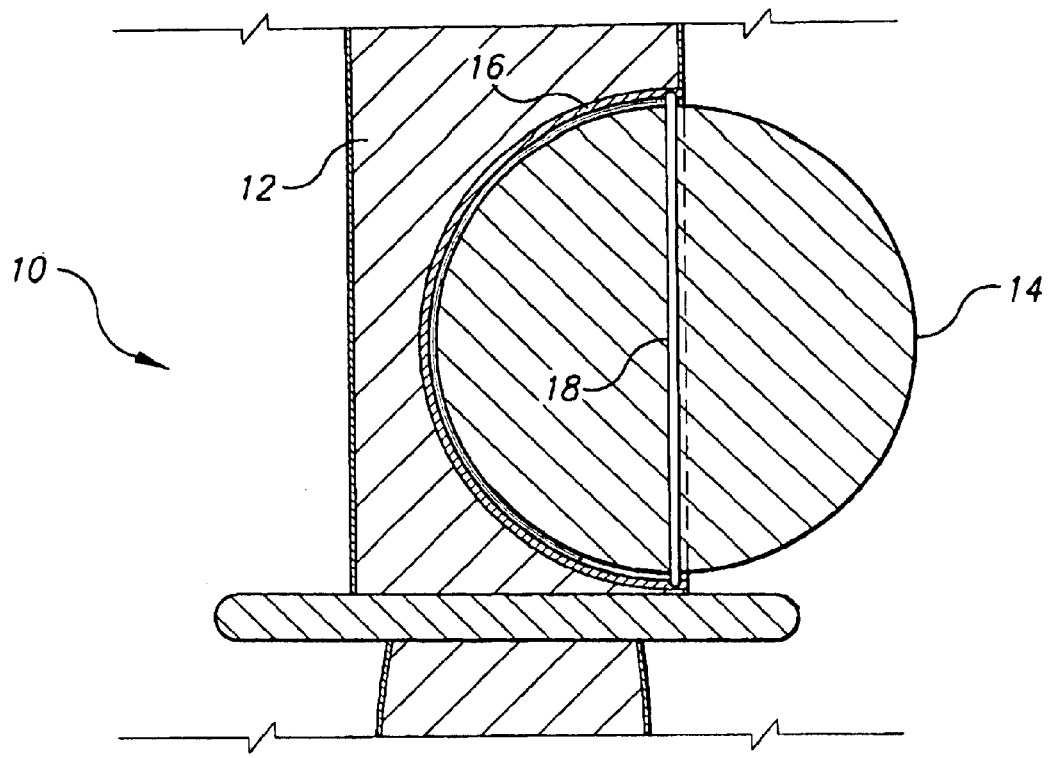
FIG. 2A is a fragmented section view of a portion of an educational toy according to the present invention, showing a first embodiment of a rotating globe.
Figure 2B:
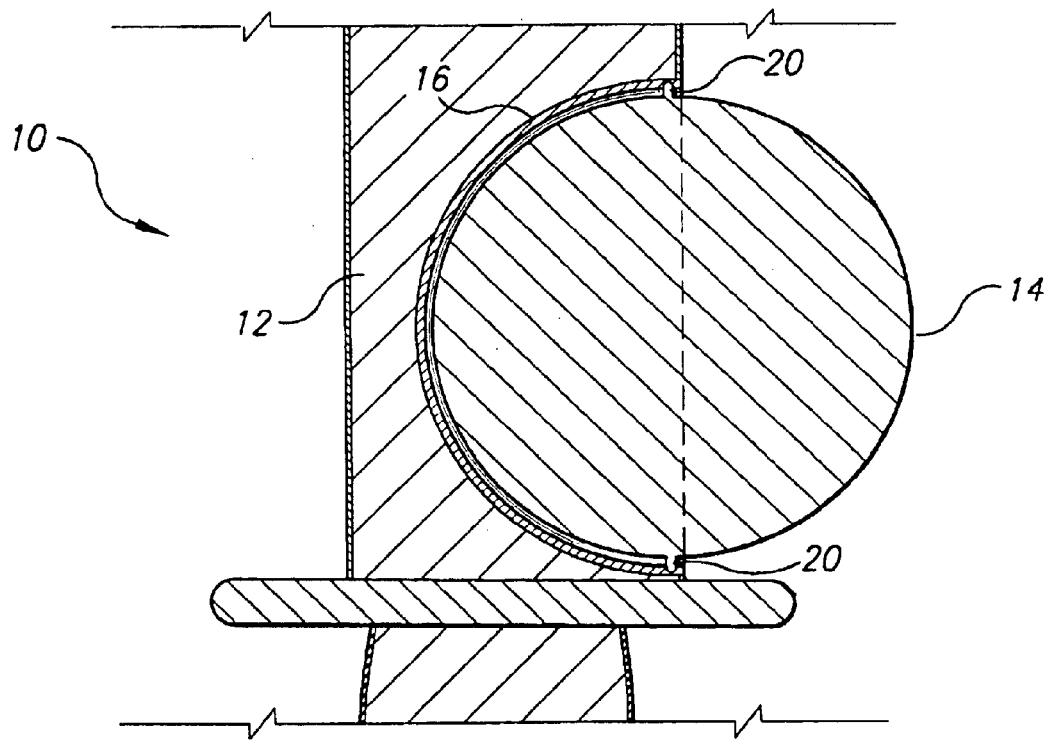
FIG. 2B is a fragmented section view of a portion of an educational toy according to the present invention, showing a second embodiment of a rotating globe.
Figure 3:
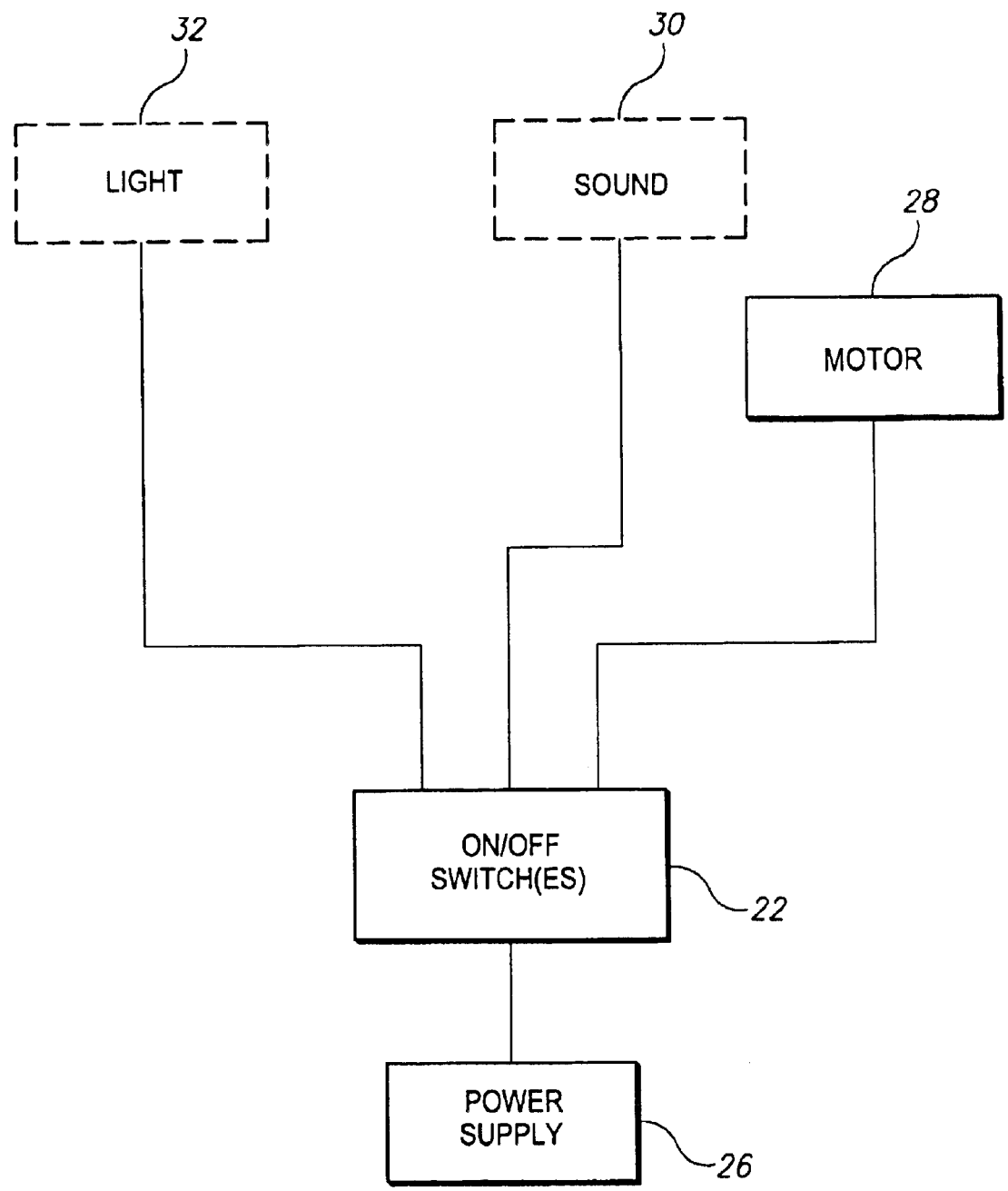
FIG. 3 is a block diagram of optional electronic circuitry for an educational toy according to the present invention for illuminating the globe, playing an audio message, or rotating the globe.

FIGS. 2A and 2B depict exemplary sectional views of a portion of the toy figure 12 and the globe 14 positioned within the toy figure 12. As can be seen, a supportive frame 16 may be disposed within the toy figure 12 for receiving the globe 14. The frame 16 can be hemispherical, semicircular, arcuate, or of any other suitable shape or structure. The frame 16 can be made from any suitable material, including, but not limited to, metal or plastic.

The globe 14 and frame 16 may be disposed in any suitable portion of the figurine. The globe 14 can be positioned within the frame 16 in any conventional manner which would allow a user to manually rotate the globe 14 within the frame 16. As shown in FIG. 2A, for example, a rod 18 or other suitable cylindrical structure may extend through the globe 14 and attach at its opposing ends to the frame 16. The globe 14 may thereby revolve around the rod 18 when manually spun. The globe 14 may be equipped with bearings where the rod 18 enters and exits the globe to ensure smooth rotation of the globe around the rod 18.

In another embodiment, shown in FIG. 2B, pins 20 may be provided to connect the globe 14 to the frame 16. The pins 20 may be fixed to diametrically opposed positions of the globe 14 and configured to rotate in holes defined within the frame 16. Alternatively, the pins 20 may be fixed in the frame 16, but rotatably mounted to the globe 14.

Optionally, the educational toy 10 may be configured to allow for automated rotation of the globe 14, illumination of the globe 14, and/or activation of an audio device. Automation of the educational toy 11 can be accomplished in any conventional manner known in the art. As shown in FIG. 4, the educational toy may be equipped with one or more switches 22, which may be located on the body of the toy figure 12, on the globe 14, or on the frame 16, that can be triggered to connect a power supply 26 to an appropriate electrical device or circuit. The power supply 26 can be, for example, one or more batteries, e.g., a watch battery, AA or AAA alkaline batteries, a lithium battery, etc. The power supply 26 provides sufficient voltage and current to activate a motor 28, a sound device 30 and/or a light source 32. Alternatively, however, the educational toy 10 may be configured in any suitable manner known in the art which would allow the motor 28, the sound device 30, and/or the light source 32 to be activated when a user touches designated portions of the globe 14 or the toy figure 12, e.g., by capacitance switches, etc., as is well known in the electrical arts.

Activation of the motor 28 initiates rotation of the globe 14. Rotation of the globe 14 provides a child with a better understanding of how the earth revolves on its axis and the cycles of day and night. The motor may be a small piezoelectric motor, a stepper motor, or any other motor known in the art.

Activation of the light source 32 illuminates the globe 14. Illumination of the globe 14 allows a child to use the toy 10 at night, while traveling in a car, for example. The light source 32 may be an incandescent light, one or more light emitting diodes, a fluorescent light, or any other illumination source known in the electrical arts. For this purpose, the globe 14 may be made of translucent material and the light source may be disposed within, behind, above, or below the globe 14.

Activation of the sound device 30 triggers an audio message which identifies or describes the geographic location(s) which are displayed once the globe 14 has returned to a stationary position after spinning. The sound device 30 may be a magnetic tape or audio chip connected to a speaker. For example, if the globe 14 stops its rotation with the continent of Europe displayed, the audio may recite an appropriate informational message, such as: "This is Europe, an area with many countries. These countries are Spain, France, Germany . . . ".

Hence the educational toy 10 provides an amusing diversion for children that also provides education regarding geography and the structure of the earth.

It is to be understood that the present invention is not limited to the embodiments described above, but encompasses, any and all embodiments within the scope of the following claims.

I claim:

1. An educational toy, comprising:

a toy figure having a body;

a globe supporting frame disposed within the body; and a globe depicting the earth rotatably mounted within the frame, at least a portion of the globe being visible outside the body, whereby the educational toy is adapted for teaching children about geography of the earth.

2. The educational toy according to claim 1, wherein said body is made from plastic.

3. The educational toy according to claim 1, wherein said body is made from fabric.

4. The educational toy according to claim 1, wherein said globe is made from plastic.

5. The educational toy according to claim 1, wherein said globe is made from fabric.

6. The educational toy according to claim 1, wherein said globe is made from foam.

7. The educational toy according to claim 1, wherein said frame is made from metal.

8. The educational toy according to claim 1, wherein said frame is made from plastic.

9. The educational toy according to claim 1, wherein said frame further comprises a rod extending through said globe, said rod having opposing ends attached to said frame, said globe being rotatable around said rod.

10. The educational toy according to claim 1, wherein aid globe further includes a pair of pins disposed at diametrically opposed positions of said globe, said pins being rotatably attached to said frame.

11. The educational toy according to claim 1, wherein said frame further includes a pair of pins, said pins being disposed at opposing positions of said frame and rotatably mounted to said globe.

12. The educational toy according to claim 1, further including means for rotating said globe electrically.

13. The educational toy according to claim 1, further including means for illuminating said globe.

14. The educational toy according to claim 1, further including means for delivering an educational audio message conveying information regarding a geographical area depicted on said globe.

\* \* \* \* \*